United States Patent Office 3,036,259
Patented May 22, 1962

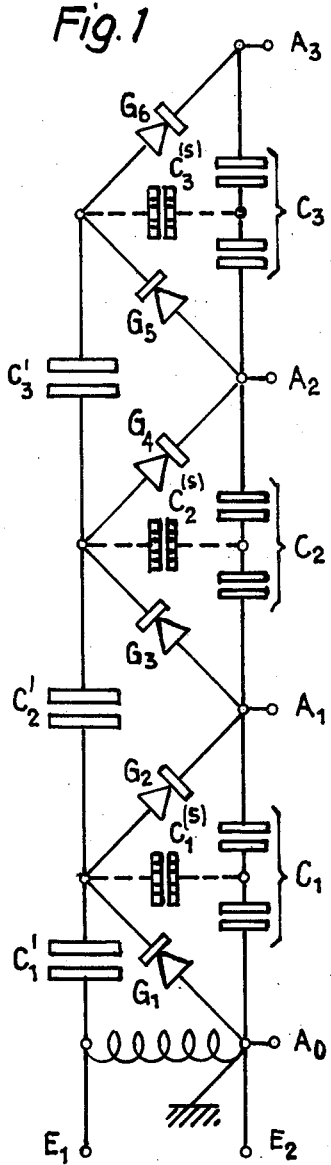
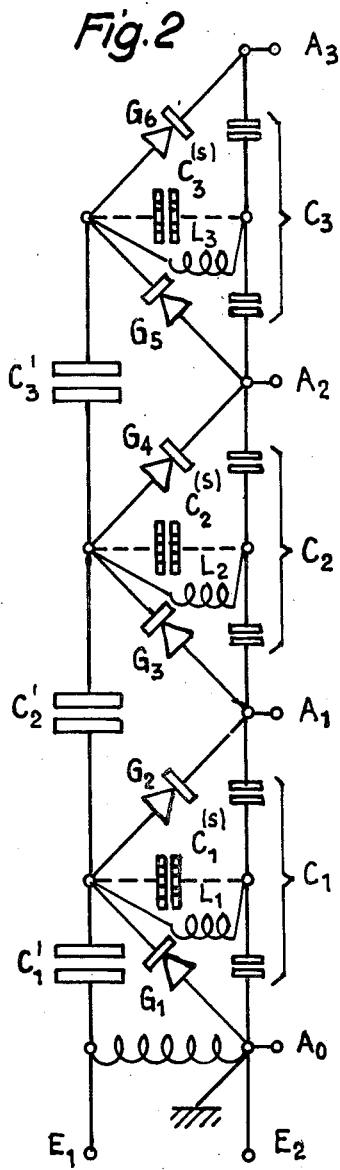

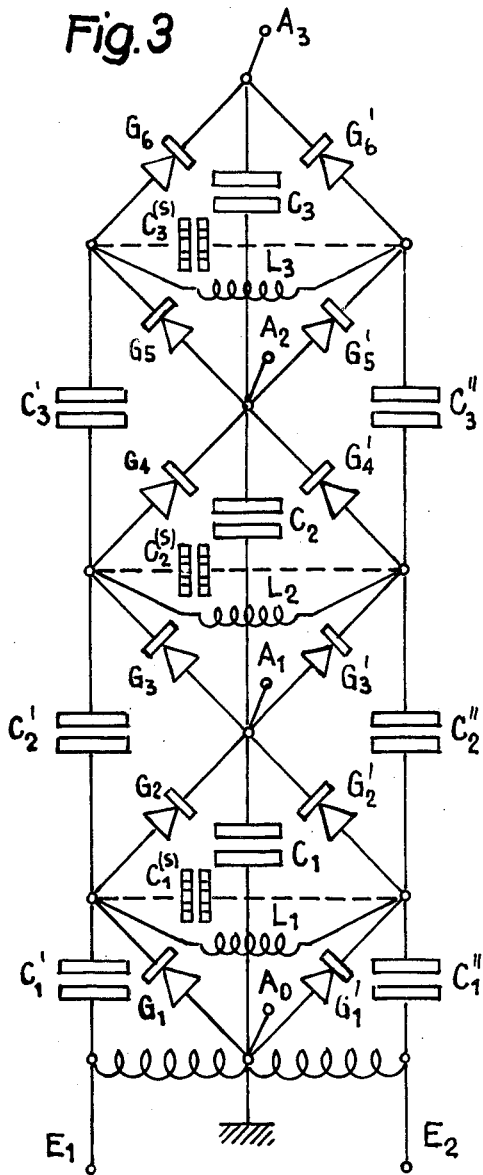

3,036,259
METHOD AND MEANS FOR THE COMPENSATION OF REACTIVE CURRENTS DUE TO STRAY CAPACITANCES BETWEEN THE CAPACITOR COLUMNS OF A CASCADE RECTIFIER
Walter Heilpern, Lindenhofstr. 7, Basel, Switzerland
Filed Sept. 23, 1958, Ser. No. 762,720
5 Claims. (Cl. 321—15)

With modern cascade rectifiers, in spite of the large number of cascade stages, the ripple of the output voltage must frequently be reduced to a value sufficiently low to suit for instance accelerators used in nuclear physics or in the electron microscope. This can be achieved by working at high frequency. This high working frequency also renders it possible to have a cascade rectifier of low internal resistance, i.e. a low voltage drop proportional to the current and due to the distribution of charge within the coupling capacitors. In the following description, the case of a working frequency exceeding 1000 cycles per second is considered. Such a high frequency is required when the rectifier is designed for very high voltages (exceeding about 2 mv.) and has therefore to be housed inside a closed tank under pressure. In order to reduce the tank diameter to an acceptable dimension, it is necessary to have a relatively low voltage per stage and consequently a large number of stages.

However, operating cascade rectifiers at high working frequencies involves very high reactive currents, due to the stray capacitances between the various capacitor columns, and this may reach considerable values with rectifiers of compact design housed within pressure tanks. Further, these reactive currents produce a high voltage drop depending on the number of stages (see for example E. Everhart and P. Lorrain, Review of Scientific Instruments 24, 221, 1953).

Reference will now be made to the accompanying drawings in which like references refer to like parts.

In the drawings:

FIG. 1 is a diagram of a cascade rectifier as referred to above.

FIG. 2 is a similar diagram illustrating one method of applying the present invention to such a rectifier.

FIG. 3 is a diagram of a full-wave rectifier embodying the present invention.

Only three stages are indicated in the drawings in order to save space. The following references used in the drawings have the respective significations:

$E_1$, $E_2$—Input voltage terminals (secondary terminals of a high voltage intermediate frequency transformer).
$A_0$, $A_1$, $A_2$, $A_3$—Connecting terminals for loading resistors and other parts, for example the electrodes of the accelerator tube.
$G_1$, $G_2$, $G_3$, $G_4$, $G_5$, $G_6$—High voltage rectifiers.
$C_1$, $C_2$, $C_3$—Smoothing capacitors of equal value $C$.
$C_1'$, $C_2'$, $C_3'$—Coupling capacitors of equal value $C'$.
$C_1^{(s)}$, $C_2^{(s)}$, $C_3^{(s)}$—Stray capacitances (assumed of equal value).

The stray capacitances are assumed to be evenly distributed along both smoothing and coupling capacitor columns. This approximation is admissible in so far as the distance between both cylindrical capacitor columns, which determines the main stray capacity components, is constant, while the capacity of the other structural parts such as the rectifier valves may be neglected. The $C_n^{(s)}$ figures represent the stray capacitance values per stage. They are shown at such points of the capacitor columns where the potential only differs by the input alternating voltage and not by an additive constant potential difference. There is therefore only an alternating voltage of the working frequency applied between such two points.

The capacitors $C_n$ and $C_n'$ are generally larger than the stray capacitances $C_n^{(s)}$. Consequently the reactive currents due to all stray capacitances $C_n^{(s)}$ flow through $C_1$ and $C_1'$; on the contrary, the capacitors $C_3$ and $C_3'$ are only loaded by the reactive current due to one single stray capacitance. In case of an $n$-stage cascade rectifier, the reactive currents through the first coupling and smoothing capacitors are therefore $n$ times higher than the currents through the last capacitors of the cascade.

In order to give an idea of the current to be considered, the following example refers to a cascade rectifier with stray capacitances of relatively high values between the coupling and smoothing capacitor columns, for example due to the rectifier being housed inside a pressure tank.

From experience it is found that the stray capacitance value $C_n^{(s)}$ amounts to 20 pf. in such a case, the number of stages being 20. The smoothing capacitors ($C_n$) and the coupling capacitors ($C_n'$) per stage have a capacity of 0.01 µf. each. The input voltage ($V_E$) is 100 kv. and the working frequency 10 kilocycles per second.

The recative current $i_{20}^{(s)}$ through the upper capacitors $C_{20}$ and $C_{20}'$ is therefore approximately $$i_{20}^{(s)} = 120 \text{ ma.}$$

Accordingly the current through the lower capacitors is:

$$i_1^{(s)} = 20 \times i_{20}^{(s)} = 2.4 \text{ a.}$$

The voltage drop due to reactive currents at the capacitors $C_{20}$ and $C_{20}'$ is of the order of 200 v. each; at the capacitors $C_1$ and $C_1'$, it reaches 4000 v. each. Both lower capacitors have therefore to carry a reactive power of almost 10 kva. Further, the overall voltage drop in the whole cascade is much too high in such case (not being dependent on the frequency).

Various ways of compensation by means of reactors have been proposed in order to reduce this voltage drop. In one case, the upper terminals of the capacitor $C_3$ and $C_3'$ are short-circuited at the end of the cascade by means of a reactor, the value of which is such that the inductive current through it is equal to the sum of all reactive currents due to the stray capacitances of the cascade. In a second method, reactors are to be connected in series with each capacitor $C_n$ and $C_n'$ so that series resonance between capacity and inductance is obtained in each stage.

In many cases both methods may reduce the voltage drop satisfactorily but they do not allow sufficient reduction of the reactive currents through the capacitors. With the second method, there does not even seem to be any current reduction because due to the series resonance the current is a maximum in both capacitor and series reactor. By the first method it is only possible to compensate for the average reactive current, as the current through the earlier capacitors is $n$ times higher than in the later ones. The maximum value of the reactive current which would occur when no compensation is applied can therefore only be reduced by approximately one half.

The coupling and smoothing capacitors used in cascade rectifiers can generally stand an additional load due to alternating currents of such magnitude only when they are suitably increased in size; this is not possible however in case of a pressure tank housing when a compact design is required. Further, a lower working frequency (for example 1 kilocycles per second) cannot be recommended. The compensating reactors should have a much higher inductance (its reciprocal varying as the square of the falling frequency), which would considerably lessen the efficiency. Further the voltage drop in the cascade due to the loading and resistance as well as the ripple of the output voltage would increase accordingly so that the desired improvement would not be obtained.

The present invention provides an improved method of compensating for the reactive currents due to stray capacitances in a cascade rectifier with a large number of stages and of a compact design (for housing in a pressure tank), by the use of compensating reactors connected across selected points in the capacitor columns at the largest possible number of stages. In such a case, the inductance of each reactor must be in parallel resonance with a definite fraction of the overall stray capacitance between the two capacitor columns, so that the condition of resonance prevails also for the total inductance of all the reactors in parallel connection and the overall stray capacitance as well. The compensation of the reactive currents is the more perfect when the number of compensating reactors agrees with the number of cascade stages of the rectifier, the inductance of each reactor being in parallel resonance with the stray capacitance of one cascade stage. When the stray capacitance between the cascade stages is relatively small, the number of compensating reactors may be less than the number of stages; for instance, the number of compensating reactors may be half the number of cascade stages, in which case the inductance of each reactor winding must be in parallel resonance with the stray capacitance corresponding to two cascade stages.

This method of compensation does not appear applicable to the connection arrangement of FIG. 1 because the various reactors can only be connected between points of the capacitor columns having the same direct current potential, viz. points the potential of which only differs by the input alternating voltage $E_1$, $E_2$. Such points can however be found readily when either the coupling or the smoothing capacitors per stage are divided into partial or individual series capacitors. FIG. 2 shows the smoothing capacitors $C_1$, $C_2$ and $C_3$ between such points as being each composed of two partial capacitors in series.

Due to the fact that high voltage direct current capacitors have to be built up of identical elements in series connection it is usually safe to assume that the capacitors comprise partial units.

Besides the standard cascade design described above, cascade rectifiers may also be composed of a single smoothing capacitor column and several coupling capacitor columns. In such cases, the stray capacitances between each coupling column and the smoothing one must be compensated, by connecting compensating reactors between each coupling capacitor column and the single smoothing column. In case of "symmetrical cascade connection" (see British Patent No. 770,605) which comprises two coupling columns and one smoothing column, the reactors can be directly connected between the two coupling capacitor columns (see FIG. 3).

It will be readily appreciated that the potential of the connection points of the coupling columns, between which the reactor windings in this figure are connected, differ only by the input alternating voltage, even when the capacitors of each stage are not composed of partial elements.

What we claim is:

1. In a rectifier for high voltages, of the order of at least one million volts, said rectifier being of the type comprising a plurality of cascaded stages, with each stage comprising two series connected capacitors, two series connected rectifiers in parallel connection with said capacitors and a third capacitor having one side connected to the junction point of the rectifiers, the cascade stages being coupled in series in such a manner that all of such series connected capacitors are connected in seires with each other and piled in a first capacitor column, and all of such third capacities are connected in series with each other and piled in a second capacitor column: means for the compensation of reactive currents due to stray capacitances between said capacitor columns, comprising a plurality of compensating reactors, each reactor having its inductance in parallel resonance with a fraction of the total stray capacitance between said columns, and the total inductance of all of said reactors being in parallel resonance with the total stray capacitance between said columns; each reactor being connected between said capacitor columns at a pair of points whose potential difference is equal only to the input A.C. voltage and is independent of any D.C. potential difference superimposed on said input A.C. voltage.

2. Compensating means as claimed in claim 1, in which the number of said compensating reactors is equal to the number of cascade stages; the inductance of each reactor being in parallel resonance with the stray capacitance corresponding to only respective stages.

3. Compensating means as claimed in claim 2, wherein each compensating reactor is connected between the junction point of the two series connected capacitors of the respective stage and the junction point of the two series connected rectifiers of the respective stage.

4. Compensating means as claimed in claim 1, wherein the number of said compensating reactors is equal to ½ the number of cascade stages; the reactors being connected between the selected points in the capacitor columns of alternate cascade stages; the inductance of each reactor being in parallel resonance with the stray capacitance corresponding to two adjacent stages.

5. In a rectifier for high voltages, of the order of at least one million volts, said rectifier being of the type comprising a plurality of cascaded stages, with each stage comprising two coupling capacitors each connected in parallel with a respective pair of series connected rectifiers and the two pairs of rectifiers being arranged symmetrically, and a smoothing capacitor connected between the junction points of the rectifiers of each pair, the cascade stages being series connected in such a manner that all of the smoothing capacitors are connected in series with each other and piled in a first capacitor column, and the respective halves of the coupling capacitors of each stage are connected in series with each other and piled in second capacitor columns, the coupling capacitor columns being connected to the smoothing capacitor column through the respective rectifiers of each stage; means for the compensation of reactive currents due to stray capacitances between said capacitor columns, comprising a plurality of compensating reactors each having its inductance in parallel resonance with a fraction of the total stray capacitance between said capacitor columns, and the total inductance of all reactors in parallel connection being in parallel resonance with the total stray capacitance between said capacitor columns; said reactors being connected between the two coupling capacitor columns at points whose potential difference is equal only to the view of the input A.C. voltage and is independent of any additional D.C. potential difference.

References Cited in the file of this patent

UNITED STATES PATENTS

| | | |
|---|---|---|
| 1,666,473 | Slepian | Apr. 17, 1928 |
| 2,452,013 | Friend | Oct. 19, 1948 |
| 2,621,302 | Friend | Dec. 9, 1952 |

FOREIGN PATENTS

| | | |
|---|---|---|
| 550,826 | Great Britain | Jan. 26, 1943 |